(12) United States Patent
Hirooka et al.

(10) Patent No.: US 10,065,342 B2
(45) Date of Patent: Sep. 4, 2018

(54) MOLDED RESIN-EQUIPPED ELECTRIC WIRE AND MOLDED RESIN-EQUIPPED ELECTRIC WIRE PRODUCTION METHOD

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Toshiya Hirooka, Mie (JP); Kouji Fukumoto, Mie (JP); Daisuke Hashimoto, Mie (JP); Jisung Kim, Mie (JP); Kenji Miyamoto, Mie (JP); Mitsuru Hirose, Mie (JP); Hitoshi Horio, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/740,105

(22) PCT Filed: Jul. 1, 2016

(86) PCT No.: PCT/JP2016/069577
§ 371 (c)(1),
(2) Date: Dec. 27, 2017

(87) PCT Pub. No.: WO2017/010308
PCT Pub. Date: Jan. 19, 2017

(65) Prior Publication Data
US 2018/0186036 A1 Jul. 5, 2018

(30) Foreign Application Priority Data
Jul. 10, 2015 (JP) ................... 2015-138407

(51) Int. Cl.
*H01R 9/05* (2006.01)
*B29C 33/12* (2006.01)
(Continued)

(52) U.S. Cl.
CPC .............. *B29C 33/12* (2013.01); *H01R 4/70* (2013.01); *H01R 43/24* (2013.01); *H01R 13/40* (2013.01)

(58) Field of Classification Search
CPC .............. H01R 9/0518; H01R 13/6593; H01R 13/5205; H01R 13/5216; H01R 13/748
See application file for complete search history.

(56) References Cited

U.S. PATENT DOCUMENTS 8,876,551 B2* 11/2014 Berger ................ H01R 24/52
439/579
9,004,947 B2* 4/2015 Tanaka ............... H01R 13/5213
439/607.41
(Continued)

FOREIGN PATENT DOCUMENTS

JP 2001162647 A 6/2001
JP 2014170618 A 9/2014

OTHER PUBLICATIONS

International Search Report for Application No. PCT/JP2016/069577 dated Sep. 13, 2016; 5 pages.

*Primary Examiner* — Phuong Chi T Nguyen
(74) *Attorney, Agent, or Firm* — Reising Ethington, P.C.

(57) ABSTRACT

When forming molded resin on a terminal-equipped conductive wire, cases where resin inside the mold for insert-molding leaks out from the mold are suppressed. A smooth portion having a smooth outer circumferential surface is (Continued)

formed in a conductive wire of a terminal-equipped conductive wire (smooth portion formation step (S2)). Furthermore, a molded resin member that covers the terminal connection portion is formed in a state where the terminal connection portion provided is inserted into an insert-molding mold, and a portion of the conductive wire that extends from a metal terminal is exposed to the outside through an opening portion of the mold (insert-molding step (S3)). The outer shape of the smooth portion is a shape that corresponds to the opening shape of the opening portion of the mold. In the insert-molding step (S3), the interior of the mold is filled with a resin in a state where the inner circumferential surface of the opening portion of the mold is in contact with the outer circumferential surface of the smooth portion.

8 Claims, 6 Drawing Sheets (51) Int. Cl.
    *H01R 43/24*     (2006.01)
    *H01R 4/70*     (2006.01)
    *H01R 13/40*     (2006.01)

(56) References Cited

U.S. PATENT DOCUMENTS

| | | | |
|---|---|---|---|
| 9,147,508 B2 * | 9/2015 | Imahori | H01B 17/308 |
| 9,147,978 B2 * | 9/2015 | Akuta | H01R 13/6581 |
| 9,882,315 B2 * | 1/2018 | Neureiter | H01R 13/6581 |
| 2013/0023158 A1 | 1/2013 | Kato et al. | |

\* cited by examiner

Before resistance welding

After resistance welding

MOLDED RESIN-EQUIPPED ELECTRIC WIRE AND MOLDED RESIN-EQUIPPED ELECTRIC WIRE PRODUCTION METHOD

CROSS REFERENCE TO RELATED APPLICATIONS

This application claims the priority of Japanese patent application JP2015-138407 filed on Jul. 10, 2015, the entire contents of which are incorporated herein.

TECHNICAL FIELD

This invention relates to technology for producing a molded resin-equipped electric wire.

BACKGROUND ART

Patent Document 1 (JP 2013-187041A) discloses a terminal-equipped electric wire that is provided with a waterproof resin portion. The waterproof resin portion is a portion that is formed by insert-molding, and is formed so as to cover a range from the insulating covering portion of an insulated electric wire to the connection portion of a metal terminal that is connected to a core wire portion of the insulated electric wire.

SUMMARY

However, with the terminal-equipped electric wire described in Patent Document 1, when the metal terminal is to be connected to the end portion of the insulated electric wire, the insulating covering needs to be stripped in order to expose the core wire portion (conductive wire) at the end portion, and this processing has been troublesome. Also, if the insulated electric wire is thick in order to handle a large current, the insulated electric wire becomes difficult to bend, and there has been a risk of poor workability when routing the insulated electric wire in a vehicle or the like. The high degree of close contact between the insulating covering and the core wire portion is thought to be one factor for difficulty in bending the insulated electric wire. One conceivable method for solving this problem is the application of a terminal-equipped conductive wire in which a terminal is attached to the end portion of a bare conductive wire that is not covered with an insulating covering, for example.

Incidentally, when insert-molding a resin member (molded resin) onto the terminal connection portion of a terminal-equipped conductive wire, the terminal connection portion is placed inside a mold for insert-molding, the portion of the bare conductive wire that extends from the terminal connection portion is exposed to the outside through an opening portion of the mold, and the interior of the mold is filled with resin in this state. However, if there are protrusions/recessions on the outer circumferential surface of the bare conductive wire, there is a risk that a gap will be formed between the conductive wire and the opening portion of the mold for insert-molding, and that the resin inside the mold will leak out from the mold through that gap.

In view of this, an object of the present design is to provide technology for, when forming molded resin on a terminal-equipped conductive wire, suppressing the case where resin inside the mold for insert-molding leaks out from the mold.

In order to solve the foregoing problem, a first aspect is a molded resin-equipped electric wire including: a terminal-equipped conductive wire including a conductive wire that is formed by an electrically conductive metal and a terminal that is connected to an end portion of the conductive wire on one side via a terminal connection portion; and a molded resin member that covers the terminal connection portion of the terminal-equipped conductive wire, wherein the conductive wire has a smooth portion having a smooth outer circumferential surface at a location separated from the terminal connection portion toward another side, and the molded resin member covers a range of the terminal-equipped conductive wire from the terminal connection portion to the smooth portion.

Also, a second aspect is the molded resin-equipped electric wire according to the first aspect, wherein the conductive wire is constituted by a plurality of metal strands bundled together into one wire.

Also, a third aspect is the molded resin-equipped electric wire according to the second aspect, wherein the smooth portion is a portion in which the plurality of metal strands are integrated by melting and solidifying.

Also, a fourth aspect is the molded resin-equipped electric wire according to the second aspect, wherein the metal strands that constitute the conductive wire each include a core wire portion formed from a first metal, and a plating portion that covers an outer side of at least a portion of the core wire portion and is formed from a second metal that has a lower melting point than the first metal, and along the outer circumferential surface of the smooth portion, melt-solidified portions of the plating portions exist between adjacent core wire portions.

Also, a fifth aspect is the molded resin-equipped electric wire according to the fourth aspect, wherein inside the smooth portion, a gap between adjacent core wire portions is filled with a melt-solidified portion of the plating portions.

Also, a sixth aspect is the molded resin-equipped electric wire according to any one of the first to fifth aspects, wherein a cross-sectional shape of the smooth portion is circular.

Also, a seventh aspect is the molded resin-equipped electric wire according to any one of the first to sixth aspects, further including a non-conducting heat shrink tube that covers an outer side of a portion of the conductive wire that is exposed from the molded resin member.

Also, an eighth aspect is the molded resin-equipped electric wire according to any one of the first to seventh aspects, wherein the molded resin member is formed so as to hold a plurality of the terminal-equipped conductive wires in a parallel state.

Also, a ninth aspect is a molded resin-equipped electric wire production method including: (a) a preparation step of preparing a terminal-equipped conductive wire in which a terminal is connected, via a terminal connection portion, to an end portion on one side of a conductive wire formed from an electrically conductive metal; (b) a smooth portion formation step of forming a smooth portion having a smooth outer circumferential surface in the conductive wire of the terminal-equipped conductive wire at a location separated from the terminal connection portion toward another side; and (c) an insert-molding step of forming a molded resin member that covers the terminal connection portion in a state where the terminal connection portion of the terminal-equipped conductive wire provided with the smooth portion is inserted into an insert-molding mold, and furthermore a portion of the conductive wire that extends from the terminal is exposed to the outside from an opening portion of the insert-molding mold, wherein an outer shape of the smooth portion formed in the smooth portion formation step is a shape that corresponds to an opening shape of the opening portion of the insert-molding mold, and the insert-molding step includes a step of filling an interior of the insert-molding mold with a resin in a state where an inner circumferential surface of the opening portion of the insert-molding mold is in contact with the outer circumferential surface of the smooth portion.

According to the first to ninth aspects, when forming the molded resin member, due to the smooth portion of the conductive wire being in contact with the opening portion of the insert-molding mold, it is possible to suppress the formation of a gap between the opening portion of the mold and the conductive wire. Accordingly, it is possible to suppress the leakage of resin from the interior of the insert-molding mold to the outside via a gap in the opening portion.

According to the second aspect, the smooth portion that is provided is formed by smoothening the unevenness formed by the metal strands, thus making it possible to suppress the leakage of resin from the insert mold when forming the molded resin member.

According to the third aspect, the smooth portion is a portion in which the metal strands are integrated by melting and solidifying, thus making it possible to fill the gaps between metal strands. For this reason, the hardness can be made higher than before integration.

According to the fourth aspect, when forming the smooth portion in the conductive wire, the outer circumferential surface of the conductive wire can be smoothened by melting and solidifying the second metal that covers the metal strands.

According to the fifth aspect, by filling gaps between core wire portions with melt-solidified portions of the plating portions, it is possible to suppress the leakage of resin inside the insert-molding mold to the outside of the insert-molding mold through a gap between core wire portions when insert-molding the molded resin member.

According to the sixth aspect, the cross-sectional shape of the smooth portion is circular, thus making it possible to eliminate the need to give consideration to the orientation of the terminal-equipped conductive wire in the circumferential direction when forming the smooth portion on the conductive wire. This therefore improves efficiency in the operation for forming the smooth portion. Also, when insert-molding the molded resin member, even if a slight amount of twisting or the like occurs in the conductive wire of the terminal-equipped conductive wire, the smooth portion can be easily disposed in the opening portion of the insert mold without completely reversing such twisting. This therefore improves efficiency in the operation for forming the molded resin member.

According to the seventh aspect, by attaching the non-conducting heat shrink tube to the bare conductor at a later time, it is possible to both insulate the conductive wire and also protect it.

According to the eighth aspect, multiple terminal-equipped conductive wires can be protected by a single molded resin member.

DESCRIPTION OF EMBODIMENTS

Hereinafter, embodiments of the present design will be described with reference to the accompanying drawings. Note that the constituent elements described in these embodiments are merely illustrative examples, and the scope of the present invention is not intended to be limited to these examples. Also, in order to facilitate understanding of the drawings, there are cases where the number of and dimensions of portions are shown in an exaggerated or simplified manner when necessary.

First Embodiment

Figure 1:
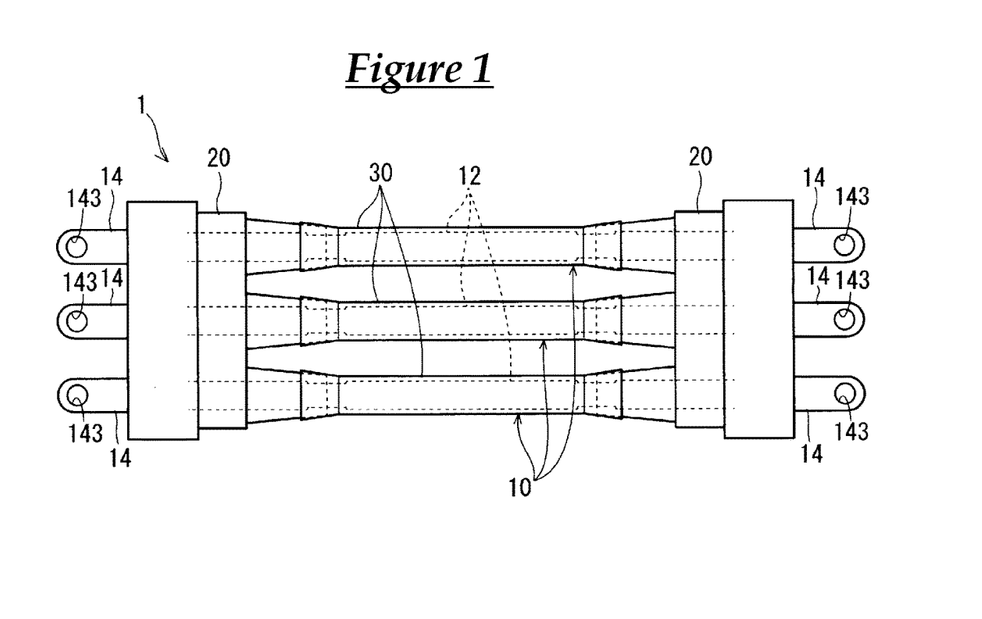
FIG. 1 is a plan view showing a molded resin-equipped electric wire according to a first embodiment.
Figure 2:
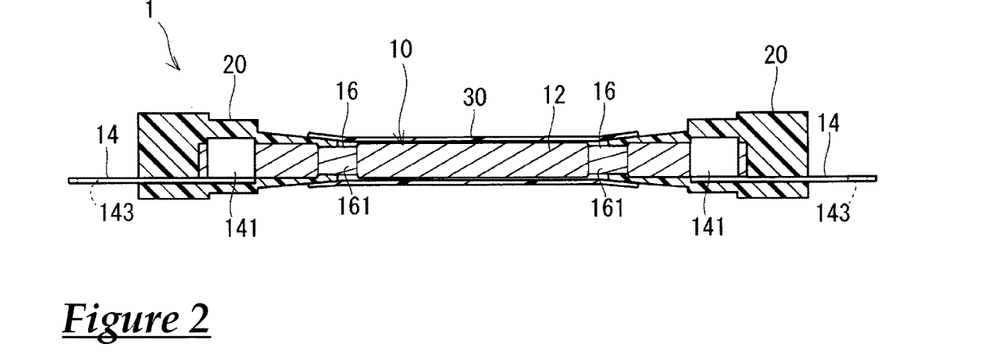
FIG. 2 is a side view of a terminal-equipped conductive wire that constitutes the molded resin-equipped electric wire according to the first embodiment.

FIG. 1 is a plan view showing a molded resin-equipped electric wire 1 according to a first embodiment. FIG. 2 is a side view of a terminal-equipped conductive wire 10 that constitutes the molded resin-equipped electric wire 1 according to the first embodiment. Note that molded resin members 20 and a heat shrink tube 30 are shown in a cross-sectional view in FIG. 2.

The molded resin-equipped electric wire 1 includes multiple (three here) terminal-equipped conductive wires 10, a pair of molded resin members 20, and multiple (three here) heat shrink tubes 30 that respectively cover conductive wires 12 of the terminal-equipped conductive wires 10. The molded resin-equipped electric wire 1 can be used in, for example, a circuit for connecting an inverter and a motor in an electric automobile, a hybrid vehicle, or the like.

The terminal-equipped conductive wires 10 are each constituted by a conductive wire 12 and metal terminals 14 that are electrically connected to end portions of the conductive wire 12 via terminal connection portions 141. Here, the terminal connection portions 141 are constituted by crimp pieces of the metal terminals 14 that are crimped to the conductive wire 12. It should be noted that the terminal connection portions 141 are not limited to being obtained by the crimped crimp pieces, and may be portions that are formed by ultrasonic welding or soldering, for example.

The conductive wire 12 is constituted as a metal wire in which multiple metal strands 13, which are constituted by an electrically conductive metal such as copper, a copper alloy, aluminum, or an aluminum alloy, are twisted and bundled together into one wire. It should be noted that the conductive wire 12 is not limited to be obtained by twisting together multiple metal strands 13. For example, the conductive wire 12 may be a metal wire (braided wire) in which multiple metal strands 13 are combined and braided together. The metal strands 13 are each constituted by a core wire portion 131 that is formed from an electrically conductive metal (first metal), and a plating portion 133 that covers the outside of the core wire portion 131 and is formed from a metal (second metal) having a lower melting point than the metal (first metal) that forms the core wire portion 131 (see FIG. 5).

The conductive wire 12 has smooth portions 16 in which the outer circumferential surface is smoother than other portions of the conductive wire 12, and each smooth portion 16 is located at a position that is, with respect to the terminal connection portion 141 of the metal terminal 14 attached to the end portion on one side, separated therefrom toward the other side. In this example, two terminal connection portions 141 are provided at respective end portions of the conductive wire 12, and two smooth portions 16 are formed respectively inward of the terminal connection portions 141. Here, the smooth portions 16 are portions of the conductive wire 12 that have been formed by hot pressing as will be described later.

The metal terminals 14 are each a component formed by performing press work or the like on a metal plate made of copper, a copper alloy, aluminum, an aluminum alloy, or the like. A circular through-hole 143 shaped as an opening is formed in a leading end portion of the metal terminal 14, and a bolt is inserted through the through-hole 143 for electrical connection to a partner connection member.

The molded resin members 20 each have an elongated shape, and are members that hold the conductive wires 12 in a parallel state at respective end portions of the conductive wires 12. The molded resin members 20 are portions made of a synthetic resin or a natural resin, and are formed by molding using a mold (insert-molding) in which the end portions of the conductive wires 12 and the base end portions of the metal terminals 14 are insert components. In this example, multiple conductive wires 12 extend in a parallel state from one surface side of each of the molded resin members 20, and the leading end portions of multiple metal terminals 14 are exposed from the surface on the opposite side. Note that the shape of the molded resin members 20 is not limited to the shape shown in FIG. 1, and may be changed as desired in accordance with the shape, connection method, or the like of the partner connection member to which the molded resin-equipped electric wire 1 is to be connected, for example. Also, in the molded resin-equipped electric wire 1 of this example, one molded resin member 20 holds multiple terminal-equipped conductive wires 10, but one molded resin member 20 may hold only one terminal-equipped conductive wire 10.

The heat shrink tubes 30 are each constituted by a resin member that is molded into a tubular shape by extrusion molding, the resin member having been stretched into a wide tubular shape while in a heated state, and then cooled thereafter. The heat shrink tube 30 obtained in this way has a shape memory property of, when heated, shrinking to the narrow tubular shape that was exhibited before being stretched. When heated, the heat shrink tube 30 shrinks to a shape that corresponds to the outer shape of the conductive wire 12 and becomes attached to the conductive wire 12. The heat shrink tube 30 is formed from a material that is not electrically conductive, and by covering the outside of the bare conductive wire 12, insulates the conductive wire 12 and also protects the conductive wire 12 from the outside. Note that the heat shrink tube 30 may cover the outside of the conductive wire 12 in a state where a gap is provided between the heat shrink tube 30 and the conductive wire 12.

Method for Producing Molded Resin-Equipped Electric Wire 1

Figure 3:
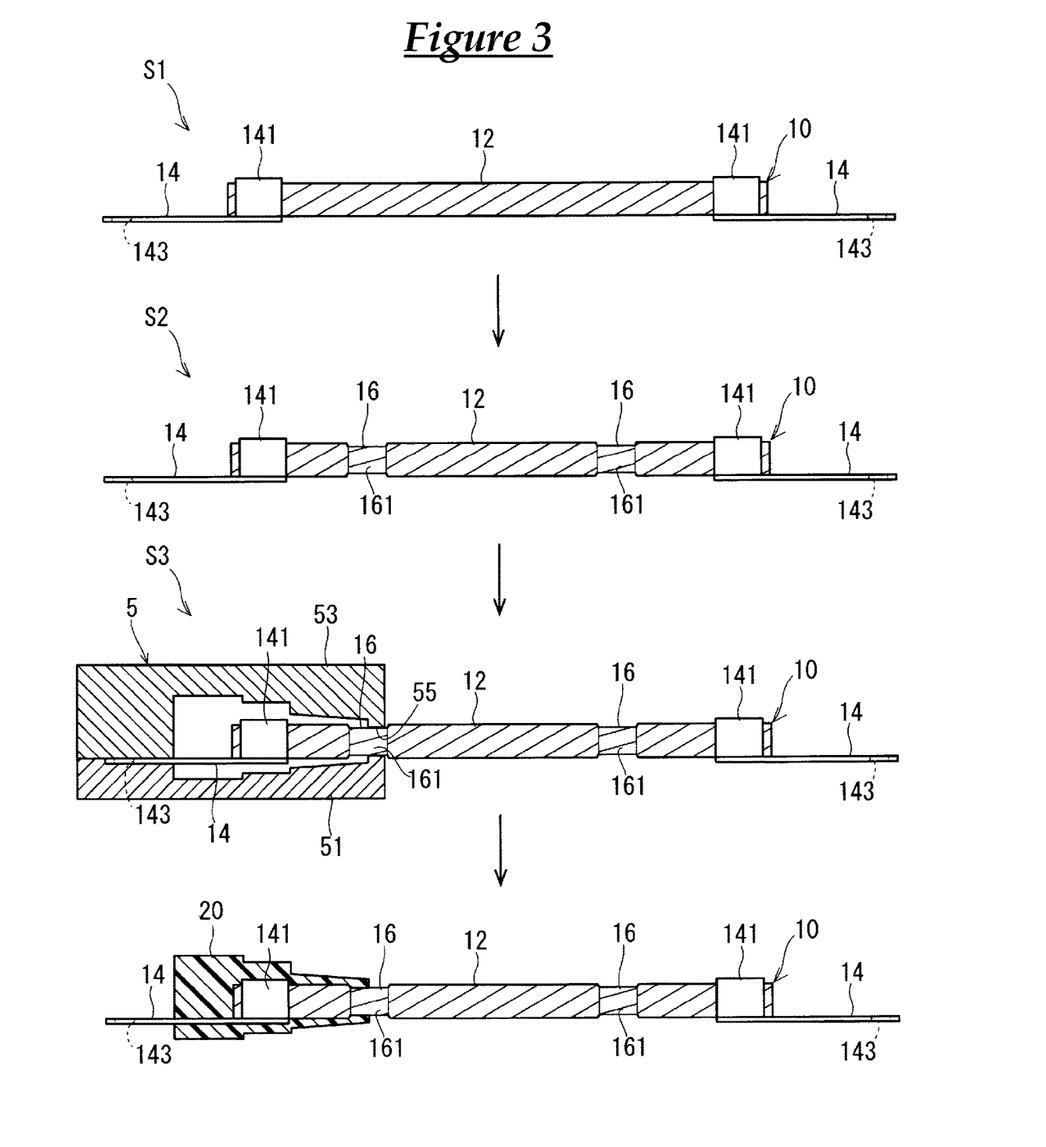
FIG. 3 is an illustrative diagram showing steps for producing the molded resin-equipped electric wire production according to the first embodiment.
Figure 4:
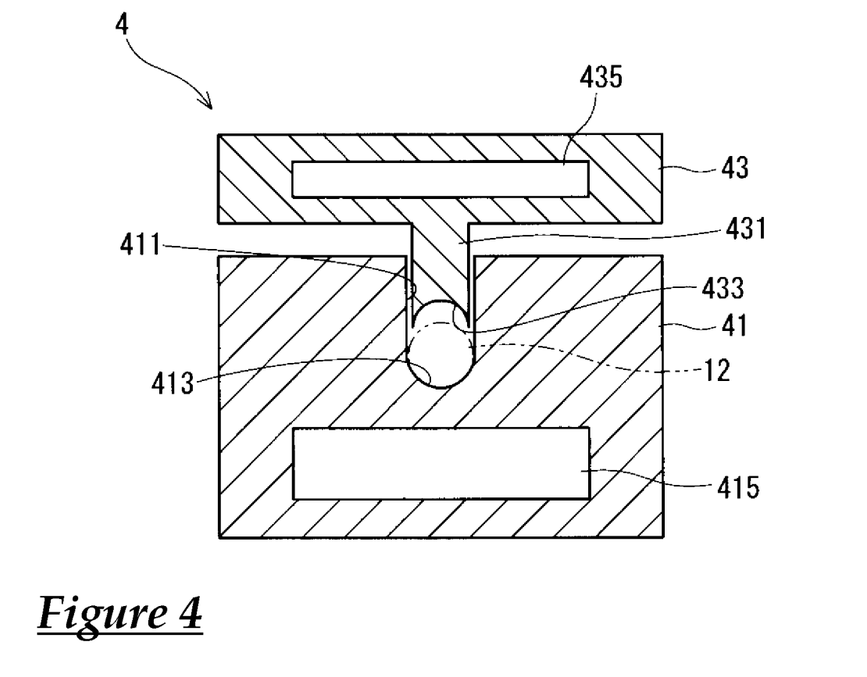
FIG. 4 is an illustrative diagram of an aspect of forming a smooth portion on a conductive wire.
Figure 5:
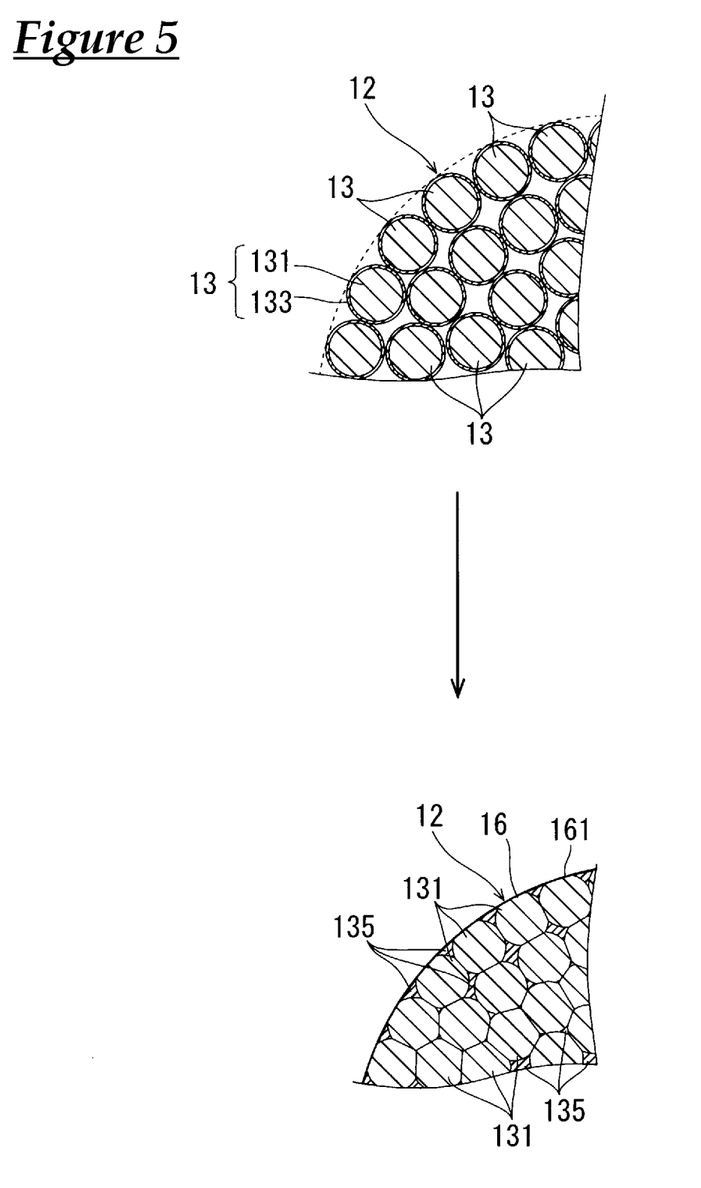
FIG. 5 is a schematic partial cross-sectional view of the conductive wire before and after formation of a smooth portion.

FIG. 3 is an illustrative diagram showing steps for producing the molded resin-equipped electric wire 1 according to the first embodiment. FIG. 4 is an illustrative diagram of an aspect of forming a smooth portion 16 in the conductive wire 12. FIG. 5 is a schematic partial cross-sectional view of the conductive wire 12 before and after formation of the smooth portion 16.

First, terminal-equipped conductive wires 10 are prepared by connecting metal terminals 14, via terminal connection portions 141, to respective end portions of bare conductive wires 12 that are not covered by an insulating covering (preparation step S1).

Next, smooth portions 16 are formed on the bare conductive wires 12 of the terminal-equipped conductive wires 10 at locations separated from the terminal connection portions 141 (smooth portion formation step S2). Here, two smooth portions 16 are provided at locations separated from respective terminal connection portions 141 of the conductive wire 12. The cross-sectional shape of the smooth portions 16 is circular. Also, the diameter of each of the smooth portions 16 is smaller than the diameter of a portion of the conductive wire 12 where the smooth portions 16 are not formed (e.g., an intermediate portion between the pair of smooth portions 16).

Note that it is desirable that the cross-sectional shape of the smooth portions 16 is a true circle that corresponds to the shape of the openings of the later-described molded resin members 20, but the cross-sectional shape is not necessarily required to be a true circle. It is sufficient that the smooth portions 16 are each formed such that a space that allows leakage of resin that fills the interior of an insert-molding mold 5, which is used when forming the molded resin members 20 as will be described later, is not formed between the inner circumferential surface of an opening portion 55 of the mold 5 and an outer circumferential surface 161 of the smooth portion 16.

As shown in FIG. 4, the smooth portions 16 are formed by hot pressing corresponding portions of the conductive wire 12 using a smooth portion forming die 4. In the example shown in FIG. 4, the smooth portion forming die 4 is constituted by a lower die 41 and an upper die 43.

A recessed portion 411, which is for accommodating a portion of the conductive wire 12 where the smooth portion 16 is to be formed, is formed in the central portion of the upper surface of the lower die 41. The bottom portion of the recessed portion 411 is a concave surface 413 that is recessed with a semicircular arc shape in a cross-sectional view. The size (radius) of the semicircular arc defined by the concave surface 413 is approximately the same as the size (radius) of the outer shape of the smooth portion 16. A protruding portion 431, which can be inserted into the recessed portion 411, is formed in the central portion of the lower surface of the upper die 43. The leading end portion of the protruding portion 431 has a concave surface 433 that is recessed with a semicircular arc shape in a cross-sectional view. The size (radius) of the semicircular arc defined by the concave surface 433 is also approximately the same as the size (radius) of the outer shape of the smooth portion 16.

Also, heat sources 415 and 435 are provided in the lower die 41 and the upper die 43 respectively. The heat source 415 of the lower die 41 heats the entirety of the lower die 41 so as to raise the surface temperature of the concave surface 413 that comes into contact with the conductive wire 12. Also, the heat source 435 of the upper die 43 heats the entirety of the upper die 43 so as to raise the surface temperature of the concave surface 433 that comes into contact with the conductive wire 12. Note that the heat sources 415 and 435 may be configured to locally raise the surface temperature of portions of the concave surfaces 413 and 433 instead of the entirety of the lower die 41 and the entirety of the upper die 43.

The concave surfaces 413 and 433 are heated to a surface temperature that is lower than the melting point of the core wire portions 131 and higher than the melting point of the plating portions 133. For example, in the case where the core wire portion 131 is formed from copper and the plating portion 133 is formed from tin, the surfaces are heated to a temperature (e.g., 300° C.) that is lower than the melting point of copper (1085° C.) and higher than the melting point of tin (231.9° C.).

Due to the cross-sectional shape of the smooth portion 16 formed in the conductive wire 12 being circular, when the conductive wire 12 is disposed in the smooth portion forming die 4, consideration does not need to be given to the direction of the terminal-equipped conductive wire 10 in the circumferential direction. This therefore improves efficiency in the operation for forming the smooth portion 16.

As shown by the cross-section of the conductive wire 12 before being hot pressed in the upper portion of FIG. 5, the outside of the core wire portion 131 of each of the metal strands 13 is covered by the plating portion 133. Also, small gaps exist between metal strands 13. In particular, the outer circumferential surface of the conductive wire 12 is an uneven surface due to the gaps between adjacent metal strands 13. The conductive wire 12 having this outer shape is hot pressed by the concave surfaces 413 and 433 that are heated to the above-described temperature, and then the conductive wire 12 is removed from the lower die 41 and cooled, thus forming the smooth portion 16 shown in the lower portion of FIG. 5.

Specifically, in the smooth portion 16, melt-solidified portions 135 (second metal portions), which are obtained by melting and solidification of the plating portions 133 of the metal strands 13, exist in the gaps between adjacent metal strands 13 (specifically, between adjacent core wire portions 131). For example, along the outer circumferential surface 161 of the smooth portion 16, melt-solidified portions 135 (second metal portions) of the plating portions 133 exist between adjacent core wire portions 131, thus filling the gaps. Furthermore, the outer circumferential surface 161 of the smooth portion 16 is pressed by the concave surfaces 413 and 433 so as to have a smooth circular shape. Inside the smooth portion 16 as well, the gaps between adjacent core wire portions 131 are filled by melt-solidified portions 135 of the plating portions 133. It should be noted that it is not essential that the gaps between core wire portions 131 are filled inside the smooth portion 16, and it is sufficient that at least the outer circumferential surface 161 of the smooth portion 16 has been smoothened. Also, it is not essential that all of the gaps between core wire portions 131 are filled inside the smooth portion 16, and a portion of the gaps may be filled.

Note that it is not essential that pressuring application and heating are performed simultaneously by the lower die 41 and the upper die 43 when forming the smooth portion 16. For example, the smooth portion 16 may be formed by locally heating the portion of the conductive wire 12 in which the smooth portion 16 is to be formed, and then applying pressure with the lower die 41 and the upper die 43 that are not provided with the heat sources 415 and 435.

Returning to FIG. 3, after the smooth portions 16 are formed in the terminal-equipped conductive wire 10 through the smooth portion formation step S2, insert-molding of the molded resin member 20 is performed in which the terminal connection portions 141 of the terminal-equipped conductive wire 10 are insert portions (insert-molding step S3). Note that although not illustrated, the mold 5 for insert-molding (the insert-molding mold) is configured to hold multiple terminal-equipped conductive wires 10 in a parallel state.

As shown in FIG. 3, in the insert-molding step S3, one terminal connection portion 141 of the terminal-equipped conductive wire 10 is inserted into the mold 5, and the portion of the conductive wire 12 that extends from the terminal connection portion 141 is exposed outside of the mold 5. The mold 5 is then filled with resin in this state (filling step).

The mold 5 is constituted by combining an upper mold 53 with a lower mold 51 from above. A concave surface formed inside the mold 5 matches the outside shape that the molded resin member 20 is to have after molding. Also, here, the lower mold 51 is provided with a concave surface into which the leading end portion of the metal terminal 14 can be fitted, and it is possible to position the leading end portion of the metal terminal 14. The metal terminal 14 is sandwiched between this concave surface and the lower surface of the upper mold 53, thereby holding the metal terminal 14 and thus the terminal-equipped conductive wire 10.

Also, one side portion of the mold 5 is provided with an opening portion 55 for passage of the portion of the conductive wire 12 that extends from the terminal connection portion 141 to the outside of the mold 5. This opening portion 55 is a portion formed by vertically combining a semicircular tube-shaped concave surface formed on the lower mold 51 with a semicircular tube-shaped concave surface of the upper mold 53. The opening portion 55 forms a connecting passage that connects the space (cavity) surrounded by the concave surfaces for molding the molded resin member of the mold 5 to the outside of the mold 5. The opening shape of the opening portion 55 is a shape that corresponds to the outer shape of the smooth portion 16 of the conductive wire 12 (here, a circular shape).

Here, the length (width) of the opening portion 55 in the central axis direction is shorter than the length of the smooth portion 16 in the central axis direction. For this reason, the inner circumferential surface of the opening portion 55 comes into contact with an inward portion of the smooth portion 16, and the end portion of the smooth portion 16 on the metal terminal 14 side is arranged inside the cavity of the mold 5. Accordingly, the end portion of this smooth portion 16 is covered by the molded resin member 20 formed by insert-molding.

The outer circumferential surface 161 of the smooth portion 16 is made smooth, and furthermore the opening shape of the opening portion 55 is a shape that corresponds to the outer shape of the smooth portion 16, thus making it possible for the smooth portion 16 to come into contact with the opening portion 55 with substantially no gap. For this reason, when the interior of the mold 5 is filled with resin, it is possible to suppress leakage to the outside of the mold 5 through a gap between the opening portion 55 and the smooth portion 16.

Also, in insert-molding, a large amount of pressure is applied in the end portion of the cavity of the mold 5. In view of this, by causing the opening portion 55 to abut against an inward portion of the smooth portion 16, it is possible to more reliably eliminate gaps, and it is possible to effectively suppress the leakage of resin from the opening portion 55.

Note that the length (width) of the opening portion 55 of the mold 5 in the central axis direction may be set approximately the same as the length of the smooth portion 16 in the central axis direction. Here, the smooth portion 16 is formed with a smaller diameter than other portions of the conductive wire 12, and therefore the conductive wire 12 can be positioned by fitting the opening portion 55 around the smooth portion 16 that has approximately the same length.

It is also conceivable for the opening width (here, the opening diameter) of the opening portion 55 to be slightly smaller than the width (here, the diameter) of the smooth portion 16. In this case, when the upper mold 53 is combined with the lower mold 51, the opening portion 55 applies pressure to the smooth portion 16 such that the smooth portion 16 becomes compressed to the size of the opening portion 55. Accordingly, it is possible to further suppress the formation of a gap between the opening portion 55 and the smooth portion 16.

Also, although the cross-sectional shape of the smooth portion 16 and the opening shape of the opening portion 55 are circular here, another shape (elliptical shape, elongated circle shape, or polygonal shape) may be used. However, by using a circular shape, even if a slight amount of twisting or the like occurs in the conductive wire 12 of the terminal-equipped conductive wire 10, the smooth portion 16 can be disposed in the opening portion 55 without completely reversing such twisting, thus improving workability. In particular, in the case where multiple terminal-equipped conductive wires 10 are disposed in the mold 5 at the same time as in this example, the effect of improving work efficiency is remarkable.

After the interior of the mold 5 is filled with resin, and the resin is allowed to harden to the extent where the shape thereof can be maintained, then the upper mold 53 is removed from the lower mold 51, and the terminal-equipped conductive wire 10 with the molded resin member 20 formed thereon is removed. Here, as shown in FIG. 3, the molded resin member 20 is formed so as to cover the outside of the terminal-equipped conductive wire 10 in a range from a portion thereof on the metal terminal 14 leading end side relative to the terminal connection portion 141 to the end portion of the smooth portion 16 on the metal terminal 14 side.

Although not illustrated, a molded resin member 20 is insert-molded in the same region on the opposite side of the terminal-equipped conductive wire 10 as well.

Note that in the case where heat shrink tubes 30 are attached to the conductive wires 12 of the terminal-equipped conductive wires 10, the terminal-equipped conductive wires 10 are inserted into the unshrunk tubular heat shrink tubes 30 either after forming the molded resin members 20 on the end portions of the terminal-equipped conductive wires 10 or before forming the molded resin members 20. After the molded resin members 20 are formed on the two end portions of the terminal-equipped conductive wires 10, the heat shrink tubes 30 are subjected to heat shrinking so as to be attached to the conductive wires 12.

Figure 6:
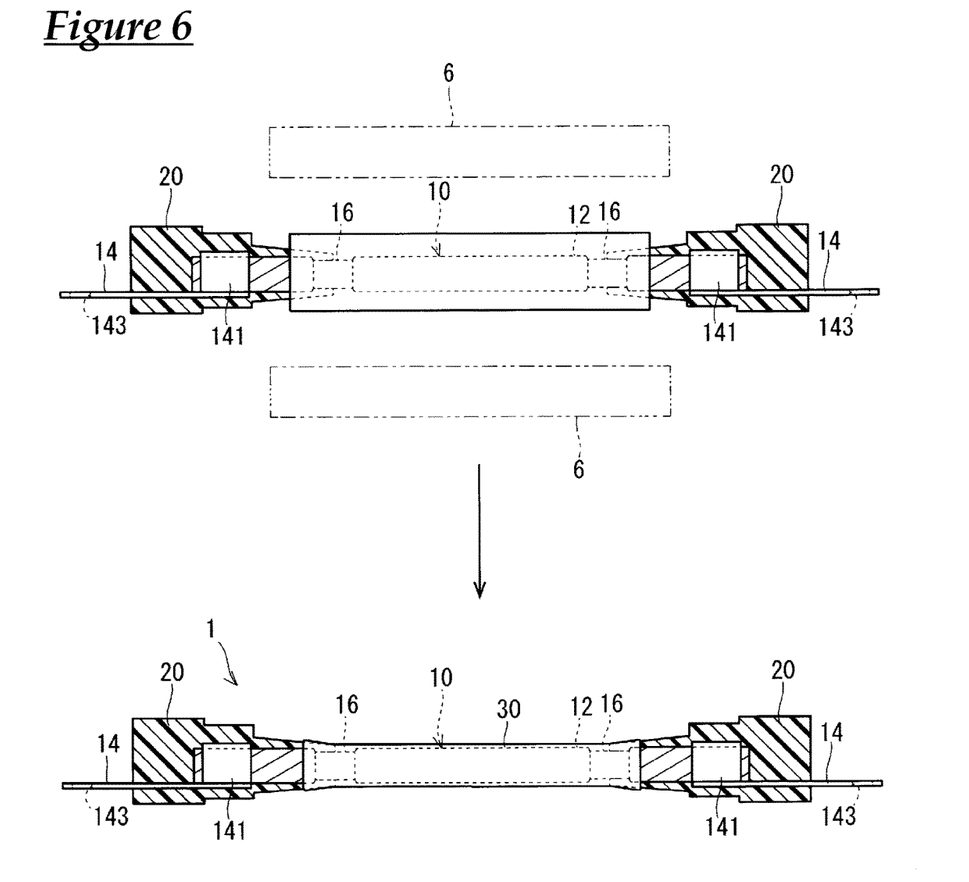
FIG. 6 is an illustrative diagram showing an aspect of attaching a heat shrink tube to a bare conductive wire.

FIG. 6 is an illustrative diagram showing an aspect of attaching the heat shrink tube 30 to the bare conductive wire 12. The molded resin members 20 on the two sides are shown in a cross-sectional view in FIG. 6. As shown in FIG. 6, the unshrunk heat shrink tube 30 is arranged so as to cover the outside of a portion from one smooth portion 16 of the conductive wire 12 exposed from the molded resin members 20 to the other smooth portion 16. The heat shrink tube 30 then shrinks to a shape that corresponds to the outer shape of the conductive wire 12 due to being heated by heaters 6 arranged above and below. Note that in the illustrated example, the portions of the heat shrink tube 30 that cover the smooth portions 16 have the same shape as the portions of the heat shrink tube 30 that cover the portions of the conductive wire 12 other than the smooth portions 16, but the portions that cover the smooth portions 16 may be recessed. Also, in this example, the heat shrink tube 30 is attached such that the two end portions of the shrunk heat shrink tube 30 cover portions of the molded resin members 20 on the two sides. Accordingly, even if a gap is formed between the conductive wire 12 and the molded resin members 20, the gap can be blocked by an end portion of the heat shrink tube.

Second Embodiment

Figure 7:
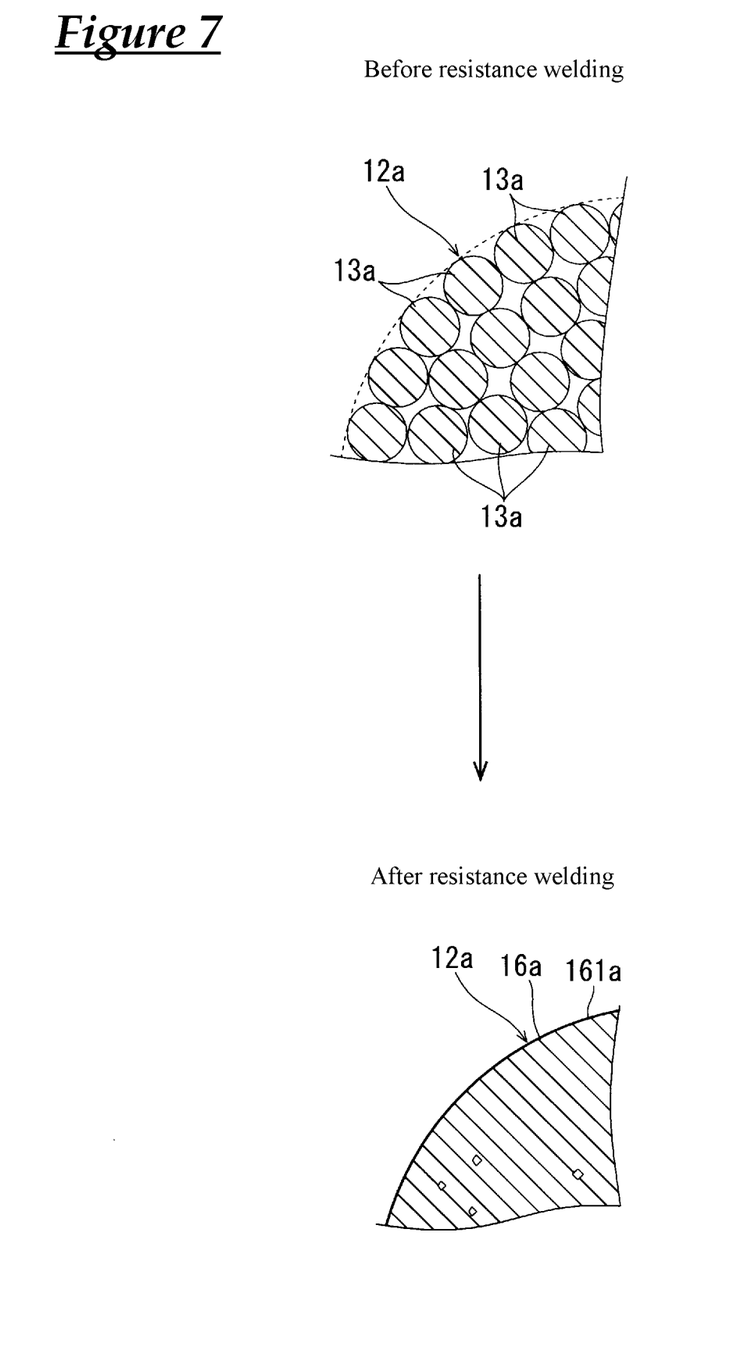
FIG. 7 is a schematic partial cross-sectional view of a conductive wire before and after formation of a smooth portion according to a second embodiment.

FIG. 7 is a schematic partial cross-sectional view of a conductive wire 12a before and after formation of a smooth portion 16a according to a second embodiment. The smooth portion 16a of the present embodiment is a portion formed by resistance welding. In the case of forming the smooth portion 16a by resistance welding, it is sufficient that the metal strands 13a that constitute the conductive wire 12a are each constituted by only an electrically conductive metal strand that is not metal-plated.

Resistance welding for forming the smooth portion 16a is performed by applying electrical current to the metal strands 13a that are twisted together to form the conductive wire 12a, while also compressing the conductive wire 12a with the concave surfaces 413 and 433 of the lower die 41 and the upper die 43 of the smooth portion forming die 4 shown in FIG. 4 for example. In the case of performing resistance welding, the smooth portion 16a can be formed by applying electrical current for a very short time (e.g., several microseconds). The processing time can therefore be shortened.

As shown in FIG. 7, the smooth portion 16a formed by resistance welding is a portion in which the metal strands 13a have become integrated due to melting and solidifying. For this reason, gaps that existed between adjacent metal strands 13 before resistance welding become filled. In this way, by integrating the metal strands 13, the hardness of the conductive wire 12a can be made higher after resistance welding than before resistance welding (i.e., before integration of the metal strands 13). Also, by performing resistance welding while compressing the conductive wire 12a with the lower die 41 and the upper die 43, an outer circumferential surface 161a of the smooth portion 16a can be made smooth.

Variations

Although the heat shrink tube 30 is employed for the purpose of insulating and protecting the conductive wire 12 in the above embodiments, other aspects may be employed. For example, it is possible to employ an aspect in which non-conducting tape is wrapped around the conductive wire 12, or an aspect in which one or more conductive wires 12 are covered with a non-conducting sheet-shaped member.

Also, in the above embodiments, the core wire portions 131 that are metal-plated with the plating portions 133 are employed as the metal strands 13. However, the metal strands may be constituted by only electrically conductive metal strands that are not metal-plated, or metal strands 13 are possible in which portions of the core wire portions 131 are metal-plated. In the case of forming the smooth portions 16 in such metal strands, it is sufficient to perform hot pressing at a higher temperature than the melting point of the metal strands. Also, the conductive wire 12 is not limited to being obtained by bundling multiple metal strands 13 into one wire. For example, the conductive wire may be a single metal wire formed by an electrically conductive metal. By providing such a metal wire with the smooth portions 16 having a smoother outer circumferential surface than the other portions, it is possible to suppress the leakage of resin from the opening portion 55 of the insert-molding mold 5 in the insert-molding step S3.

Also, in the above embodiments, the smooth portion 16 is formed by hot pressing the conductive wire 12. However, a configuration is possible in which the heating of the conductive wire 12 is omitted, and the smooth portion 16 is formed by pressing the conductive wire 12. Also, instead of forming the smooth portion 16 by hot pressing, a smooth portion having a smooth outer circumferential surface may be formed by attaching a separate member having a smooth outer circumferential surface to the conductive wire 12. Conceivable examples of such a separate member include a tape material that can be wrapped around and fixed to the conductive wire 12, and a ring-shaped member that is made of a resin or a metal. Note that if the smooth portion is formed by attaching a separate member, there are cases where the smooth portion becomes thicker than the portions of the conductive wire 12 other than the smooth portion.

Although this design has been described in detail above, the above description is illustrative in all respects, and this invention is not limited to the above description. It will be understood that numerous variations not illustrated here can be envisioned without departing from the range of this invention. Also, the configurations described in the above embodiment and variations can be appropriately combined or omitted as long as no contradiction arises.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

1 Molded resin-equipped electric wire
10 Terminal-equipped conductive wire
12 Conductive wire
13 Metal strand
131 Core wire portion
133 Plating portion
135 Melt-solidified portion
14 Metal terminal
141 Terminal connection portion
16 Smooth portion
161 Outer circumferential surface
20 Molded resin member
30 Heat shrink tube
4 Smooth portion forming die
411 Recessed portion
413 Concave surface
415 Heat source
431 Protruding portion
433 Concave surface
435 Heat source
5 Mold (insert-molding mold)
55 Opening portion
6 Heater
S1 Preparation step
S2 Smooth portion formation step
S3 Insert-molding step

The invention claimed is:

1. A molded resin-equipped electric wire comprising:
a terminal-equipped conductive wire including a conductive wire that is formed by an electrically conductive metal and a terminal that is connected to an end portion of the conductive wire on one side via a terminal connection portion;
a molded resin member that covers the terminal connection portion of the terminal-equipped conductive wire; and
a non-conducting heat shrink tube that covers an outer side of a portion of the conductive wire that is exposed from the molded resin member,
wherein the conductive wire has a smooth portion having a smooth outer circumferential surface at a location separated from the terminal connection portion toward another side, and
the molded resin member covers a range of the terminal-equipped conductive wire from the terminal connection portion to the smooth portion.

2. The molded resin-equipped electric wire according to claim 1, wherein a cross-sectional shape of the smooth portion is circular.

3. The molded resin-equipped electric wire according to claim 1, wherein the molded resin member is formed so as to hold a plurality of the terminal-equipped conductive wires in a parallel state.

4. The molded resin-equipped electric wire according to claim 1, wherein the conductive wire is constituted by a plurality of metal strands bundled together into one wire.

5. The molded resin-equipped electric wire according to claim 4, wherein the smooth portion is a portion in which the plurality of metal strands are integrated by melting and solidifying.

6. The molded resin-equipped electric wire according to claim 4,
wherein the metal strands that constitute the conductive wire each include
a core wire portion formed from a first metal, and
a plating portion that covers an outer side of at least a portion of the core wire portion and is formed from a second metal that has a lower melting point than the first metal, and
along the outer circumferential surface of the smooth portion, melt-solidified portions of the plating portions exist between adjacent core wire portions.

7. The molded resin-equipped electric wire according to claim 6, wherein inside the smooth portion, a gap between adjacent core wire portions is filled with a melt-solidified portion of the plating portions.

8. A molded resin-equipped electric wire production method comprising:
(a) a preparation step of preparing a terminal-equipped conductive wire in which a terminal is connected, via a terminal connection portion, to an end portion on one side of a conductive wire formed from an electrically conductive metal;

(b) a smooth portion formation step of forming a smooth portion having a smooth outer circumferential surface in the conductive wire of the terminal-equipped conductive wire at a location separated from the terminal connection portion toward another side; and (c) an insert-molding step of forming a molded resin member that covers the terminal connection portion in a state where the terminal connection portion of the terminal-equipped conductive wire provided with the smooth portion is inserted into an insert-molding mold, and furthermore a portion of the conductive wire that extends from the terminal is exposed to the outside from an opening portion of the insert-molding mold, wherein an outer shape of the smooth portion formed in the smooth portion formation step is a shape that corresponds to an opening shape of the opening portion of the insert-molding mold, the insert-molding step includes a step of filling an interior of the insert-molding mold with a resin in a state where an inner circumferential surface of the opening portion of the insert-molding mold is in contact with the outer circumferential surface of the smooth portion, and a non-conducting heat shrink tube covers an outer side of a portion of the conductive wire that is exposed from the molded resin member.

\* \* \* \* \*